(12) United States Patent
Yang et al.

(10) Patent No.: US 10,084,338 B2
(45) Date of Patent: Sep. 25, 2018

(54) WIRELESS CHARGING UNIT AND COUPLER BASED DOCKING COMBO FOR A WIRELESS DEVICE

(71) Applicants: Songnan Yang, San Jose, CA (US); Bin Xiao, San Ramon, CA (US); Ulun Karacaoglu, San Diego, CA (US)

(72) Inventors: Songnan Yang, San Jose, CA (US); Bin Xiao, San Ramon, CA (US); Ulun Karacaoglu, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 149 days.

(21) Appl. No.: 14/869,977

(22) PCT Filed: Jul. 31, 2013

(86) PCT No.: PCT/US2013/052978
§ 371 (c)(1),
(2) Date: Sep. 29, 2015

(87) PCT Pub. No.: WO2015/016898
PCT Pub. Date: Feb. 5, 2015

(65) Prior Publication Data
US 2016/0134149 A1     May 12, 2016

(51) Int. Cl.
| H02J 7/00 | (2006.01) |
| H02J 7/04 | (2006.01) |
| G06F 1/16 | (2006.01) |
| G06F 1/26 | (2006.01) |
| H02J 50/05 | (2016.01) |
| H02J 50/80 | (2016.01) |

(52) U.S. Cl.
CPC ............ *H02J 7/045* (2013.01); *G06F 1/1632* (2013.01); *G06F 1/26* (2013.01); *H02J 7/0021* (2013.01); *H02J 50/05* (2016.02); *H02J 50/80* (2016.02); *H02J 2007/0096* (2013.01)

(58) Field of Classification Search
USPC ......................................................... 320/108
See application file for complete search history.

(56) References Cited

U.S. PATENT DOCUMENTS

| 6,501,435 B1 | 12/2002 | King et al. |
| 8,633,616 B2 | 1/2014 | Soar |
| 8,716,902 B2 * | 5/2014 | Rhodes ................. G06F 1/1632 307/104 |
| 8,749,195 B2 | 6/2014 | Tabata et al. |

(Continued)

FOREIGN PATENT DOCUMENTS

| CN | 102804549 A | 11/2012 |
| JP | 2003-36427 A | 2/2003 |

(Continued)

OTHER PUBLICATIONS

Supplemental Notice of Allowance received for U.S. Appl. No. 13/603,677, dated Jun. 5, 2015, 5 pages.

(Continued)

*Primary Examiner* — Samuel Berhanu
(74) *Attorney, Agent, or Firm* — Schiff Hardin LLP

(57) ABSTRACT

Described herein are techniques related to one or more systems, apparatuses, methods, etc. for implementing a wireless charging and a wireless connectivity combo in a device.

25 Claims, 11 Drawing Sheets

(56) References Cited

U.S. PATENT DOCUMENTS

| | | |
|---|---|---|
| 9,166,652 B2 | 10/2015 | Yang et al. |
| 2002/0198031 A1 | 12/2002 | Holmes et al. |
| 2006/0159158 A1 | 7/2006 | Moore et al. |
| 2008/0165066 A1 | 7/2008 | Tiscareno et al. |
| 2009/0206675 A1 | 8/2009 | Camurati et al. |
| 2010/0201189 A1 | 8/2010 | Kirby et al. |
| 2011/0018360 A1 | 1/2011 | Baarman et al. |
| 2011/0050164 A1 | 3/2011 | Partovi et al. |
| 2011/0156640 A1 | 6/2011 | Moshfeghi |
| 2011/0164471 A1 | 7/2011 | Baarman et al. |
| 2012/0081213 A1 | 4/2012 | Rosenblatt |
| 2012/0099566 A1 | 4/2012 | Laine et al. |
| 2012/0171951 A1 | 7/2012 | 't Hooft |
| 2012/0180086 A1 | 7/2012 | Yang |
| 2012/0282858 A1 | 11/2012 | Gill et al. |
| 2013/0002039 A1 | 1/2013 | Kusamitsu |
| 2013/0015811 A1 | 1/2013 | Tang et al. |
| 2013/0043735 A1 | 2/2013 | Low et al. |
| 2013/0093388 A1 | 4/2013 | Partovi |
| 2013/0260677 A1 | 10/2013 | Partovi |
| 2014/0232331 A1 | 8/2014 | Stamenic et al. |
| 2014/0253024 A1 | 9/2014 | Rautiainen et al. |
| 2014/0327394 A1 | 11/2014 | Asselin et al. |
| 2015/0035474 A1 | 2/2015 | Yang et al. |
| 2015/0130286 A1 | 5/2015 | Kozasu et al. |
| 2015/0194837 A1 | 7/2015 | Tom et al. |

FOREIGN PATENT DOCUMENTS

| | | |
|---|---|---|
| JP | 2009-55379 A | 3/2009 |
| JP | 2011-120319 A | 6/2011 |
| JP | 2012-60721 A | 3/2012 |
| JP | 2012-530481 A | 11/2012 |
| JP | 2012-253936 A | 12/2012 |
| JP | 2013-78238 A | 4/2013 |
| KR | 10-1163574 B1 | 7/2012 |
| KR | 10-2012-0129821 A | 11/2012 |
| KR | 10-2013-0018506 A | 2/2013 |
| WO | 2013/056879 A1 | 4/2013 |
| WO | 2014/039133 A1 | 3/2014 |
| WO | 2015/016898 A1 | 2/2015 |

OTHER PUBLICATIONS

Non-Final Office Action received for U.S. Appl. No. 13/954,526, dated Apr. 30, 2015, 7 pages.
Non-Final Office Action received for U.S. Appl. No. 13/954,526, dated Aug. 20, 2015, 10 pages.
Non-Final Office Action received for U.S. Appl. No. 13/954,526, dated Dec. 14, 2015, 9 pages.
Non-Final Office Action received for U.S. Appl. No. 13/954,526, dated Mar. 24, 2016, 11 pages.
Non-Final Office Action received for U.S. Appl. No. 13/954,526, dated Sep. 19, 2016, 8 pages.
Notice of Allowance received for U.S. Appl. No. 13/954,526, dated Sep. 29, 2016, 11 pages.
Office Action received for Japanese Patent Application No. 2016-519487, dated Dec. 6, 2016, 12 pages Japanese Office Action including 6 Pages of English Translation.
International Preliminary Report on Patentability and Written Opinion received for PCT Patent Application No. PCT/US2013/046475, dated Mar. 19, 2015, 6 pages.
International Search Report and Written Opinion received for PCT Patent Application No. PCT/US2013/046475, dated Sep. 26, 2013, 09 pages.
International Search Report and Written Opinion received for PCT Patent Application No. PCT/US2013/052978, dated May 2, 2014, 15 pages.
Office Action received for Chinese Patent Application No. 201410369149.7, dated Jan. 29, 2016, 7 pages of Chinese Office Action only.
International Preliminary Report on Patentability and Written Opinion Received for PCT Patent Application No. PCT/US2013/052978, dated Feb. 11, 2016, 11 pages.

* cited by examiner

WIRELESS CHARGING UNIT AND COUPLER BASED DOCKING COMBO FOR A WIRELESS DEVICE

BACKGROUND

A docking station arrangement may provide a way of connecting peripherals such as a monitor, a keyboard, a mouse, an external hard drive, a webcam, etc. to a device, such as a laptop computer. A wide range of different devices such as mobile phones, tablets, etc. may be docked to provide a convenient connection to these peripherals.

The docking station arrangement may facilitate a wireless charging and a wireless connectivity to the device. For example, the wireless charging may be implemented through a power transfer from the docking station to the device. The wireless power transfer may require, for example, a set of electrodes to be installed or mounted in the device and the docking station. On the other hand, the wireless connectivity may require additional coupler antennas to be installed in the device and the docking station.

With smaller and thinner devices, the installation or mounting of the set of electrodes and the coupler antennas are physically limited by availability of space within such devices. For example, to integrate the set of electrodes into thinner devices, the integration may not add undesirable thickness size to its overall structure. Furthermore, the integration of the coupler antennas and the set of electrodes in the device may generate interferences to the wireless connectivity and affect efficiency of the wireless charging.

Accordingly, a solution allowing efficient integration of the set of electrodes and the coupler antenna into such devices is desired.

DETAILED DESCRIPTION

Figure 1:
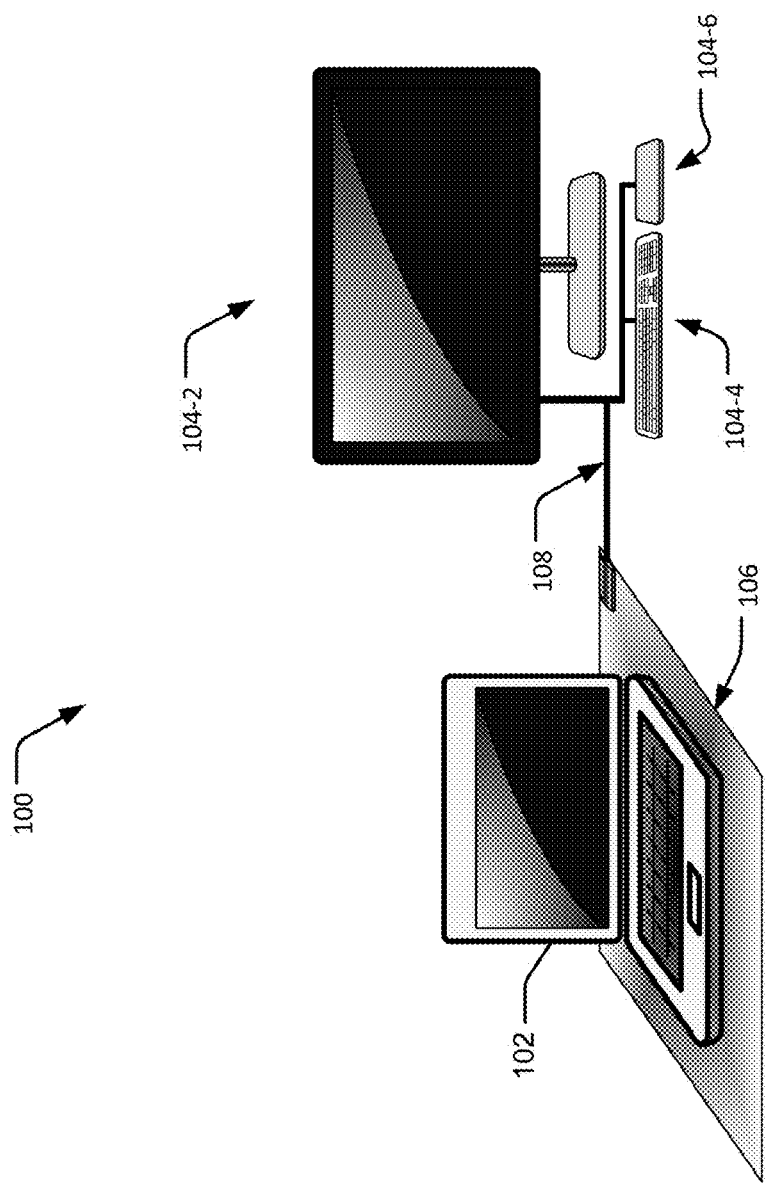
FIG. 1 illustrates an example docking station arrangement.

This document discloses one or more systems, apparatuses, methods, etc. for implementing a wireless charging and a wireless connectivity combo in a device. For example, a device utilizes a wireless charging unit and a coupler antenna to implement the wireless charging and the wireless connectivity, respectively. In this example, the coupler antenna may be integrated into the wireless charging unit. The integration, for example, minimizes the interference that may be provided by the wireless charging to the wireless connectivity.

In an exemplary implementation, the device includes the wireless charging unit in its base. The wireless charging unit, for example, is utilized to receive a charging power from another device such as a docking station. In this example, the wireless charging unit is paired with a capacitive-charger component that is installed in a docking surface of the docking station.

The close proximity (i.e., during pairing) between the wireless charging unit and the capacitive-charger component may facilitate the transfer of the charging power through capacitive coupling. For example, the device through its wireless charging unit may receive the charging power that is generated by the capacitive-charger component. The charging through capacitive coupling may provide unique characteristics, such as position flexibility, high power transfer, high transfer efficiency, and no added heights to the device.

In an exemplary implementation, the wireless charging unit includes a conductive chassis (e.g., metallic chassis) that is configured to act as a passive device electrode. In this implementation, the conductive chassis includes a cutout that forms an opening along a planar surface of the conductive chassis. The cutout is then covered with a dielectric insert, which is used to insulate the wireless charging unit and particularly, the passive device electrode from an active device electrode.

The dielectric insert includes, for example, a plastic material to provide mechanical strength to the cutout. In an exemplary implementation, a conductive plate is integrated into the dielectric insert. For example, the conductive plate is configured to act as the active device electrode that is mounted or laminated to the dielectric insert. In this example, the combination of the passive device electrode and the active device electrode facilitates the reception of the capacitive wireless charging power.

As an example of present implementations herein, the coupler antenna is integrated to the wireless charging unit to form the wireless docking combo. In this wireless docking combo, the coupler antenna facilitates the receiving or transmitting of a data signal. On the other hand, the wireless charging unit separately receives the charging power from the docking station. In other words, the coupler antenna and the wireless charging unit are operating on separate signals. For example, the data signal is received and processed by a wireless fidelity (Wi-Fi) module during the wireless connectivity while the charging power is received and processed by the wireless charging unit.

The wireless docking combo should separate the wireless charging signal and wireless connectivity data signal. To prevent the capacitive wireless charging power from interfering with the data signal, a high-frequency filter (e.g., decoupling capacitors, attenuators, etc.) may be utilized to couple the coupler antenna to the Wi-Fi module. For example, the high-frequency filter acts as a short circuit to the data signal while it provides a high impedance to the capacitive wireless charging power. In this example, the decoupling capacitors may further provide capacitance reduction in the wireless docking combo to maintain wireless charging efficiency. Furthermore, to prevent additional capacitance that is introduced by the wireless docking combo, a circuit area of a ground reference is reduced. For example, the ground reference includes the circuit area that carries the same potential as the active device electrode in the wireless charging unit.

FIG. 1 illustrates an example docking station arrangement 100 that shows a device (e.g., wireless device) connecting with peripheral devices through a docking station. FIG. 1 includes, for example, a wireless device 102, peripheral devices 104, a docking station 106, and a wired link 108. In certain implementations wired link 108 is multiple links from the docking station to each peripheral. The peripheral devices 104 include, for example, a monitor 104-2, a keyboard 104-4, and a mouse 104-6. It is understood that the list of peripherals is not limiting, and that other peripherals may include an external hard drive, web cam, etc.

The wireless device 102 utilizes the docking station 106 to establish wireless communications with the peripheral devices 104. For example, the wireless device 102 is using the monitor 104-2 as an extended wireless display (i.e., Wi-Di). In this example, the wireless device 102 is positioned in close proximity (e.g., few millimeters) with the docking station 106 in order to utilize the monitor 104-2. The docking station 106 herein is connected to the monitor 104-2 through the wired link 108. On the other hand, the wireless connectivity between the wireless device 102 and the docking station 106 is implemented through their respective coupler antennas (not shown).

In another scenario, the wireless device 102 utilizes the docking station 106 for wireless charging. For example, the wireless device 102 includes a wireless charging unit (not shown) that is configured to receive a capacitive wireless power transfer from the docking station 106. In this example, the capacitive wireless power transfer is implemented through electrical influence between the wireless charging unit and a capacitive-charger component (not shown) of the docking station 106.

In an implementation, the wireless charging unit includes a set of device electrodes (i.e., active and passive electrodes) that are positioned in a bottom surface or base of the wireless device 102. This set of electrodes are paired, for example, with the capacitive-charger component that are positioned on top planar surface (i.e., docking surface) of the docking station 106. The top planar surface contains, for example, an area where the base of the wireless device 102 is typically landing during docking operations.

In an implementation, the wireless device 102 may include, but is not limited to, a tablet computer, a netbook computer, a notebook computer, a laptop computer, mobile phone, a cellular phone, a smartphone, a personal digital assistant, a multimedia playback device, a digital music player, a digital video player, a navigational device, a digital camera, and the like.

Similarly, the peripheral devices 104 may include, but are not limited to, Input, Output, or Storage peripheral devices 104. The input peripheral device 104 may provide input to the wireless device 102 from a user such as through the keyboard 104-4, mouse 104-6, or a webcam (not shown) etc. The output peripheral device 104 may provide output to the user such as, for example, the monitor 104-2 or a printer (not shown). A storage peripheral device 104 may store data (not shown) in between computing sessions such as through a hard drive (not shown) or flash drive (not shown).

Figure 2:
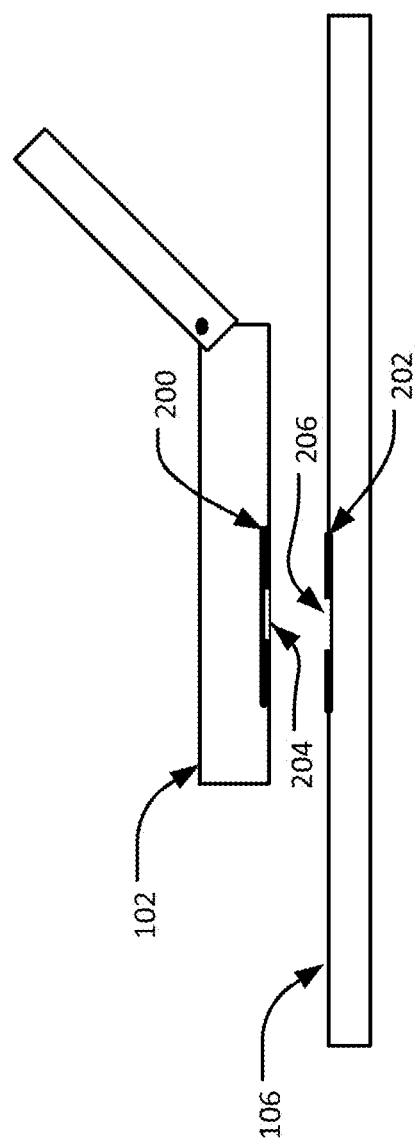
FIG. 2 illustrates an example scenario that implements a wireless charging and a wireless connectivity between a device and a docking station.

FIG. 2 illustrates an example scenario that implements wireless charging and wireless connectivity between the wireless device 102 and the docking station 106.

As shown, FIG. 2 illustrates the wireless device 102 with a wireless charging unit 200, and the docking station 106 with mounted capacitive-charger component 202. Additionally, a coupler antenna 204 is integrated to the wireless charging unit 200 while another coupler antenna 206 is integrated to the capacitive-charger component 202.

In an exemplary implementation, the wireless device 102 docks to the planar surface of the docking station 106 in order to transmit or receive wireless data transfer. For example, the close proximity between the coupler antennas 204 and 206 establishes a wireless communication between the wireless device 102 and the docking station 106. In this example, the established wireless communication is utilized for the transmission and reception of the wireless data transfer. For example, their respective coupler antennas are positioned perpendicularly with each other in order to facilitate position flexibility during docking operations between the wireless device 102 and the docking station 106.

During wireless data transfer operation, the wireless device 102 may further receive the charging power through the electrical influence between the wireless charging unit 200 and the capacitive-charger component 202. For example, the capacitive-charger component 202 are energized to generate electric fields. In this example, the generated electric fields may facilitate transfer of the charging power to the wireless charging unit 200 that is positioned in close proximity with the capacitive-charger component 202. In other words, when the wireless device 102 is docked in the docking station 106 to perform wireless connectivity (e.g., wireless data transfer), the wireless device 102 may receive the charging power as well. The perpendicular placement of wireless charging unit 200 and the capacitive-charger component 202 may allow relative position flexibility of wireless device 102. Wireless charging unit 200 and the capacitive-charger component 202 may be referred to as electrodes.

With integrated wireless charging unit 200 and the capacitive-charger component 202, the separation of wireless charging signal and data signal is necessary to process to process them individually. In an implementation, the integration of the coupler antenna 204 to the wireless charging unit 200 may introduce additional unwanted amount of capacitance that may affect the efficiency of the wireless charging. To this end, additional decoupling capacitances (not shown) may be integrated to the circuitry of the wireless charging unit 200 and the coupler antenna 204 to obtain high wireless charging efficiency. At the same time, the decoupling capacitances also minimize the effects (e.g., interference) of the charging power to the wireless data transfer.

With continuing reference to FIG. 2, the coupler antennas 204 and 206, for example, may include individual microstrip lines that are positioned perpendicularly with one another. For example, the microstrip lines of the coupler antenna 204 is positioned perpendicularly in direction to the microstrip lines of the coupler antenna 206. In this example, the perpendicular configuration provides an overlapping area to generate a high coupling coefficient and position flexibility between the coupler antennas.

Figure 3:
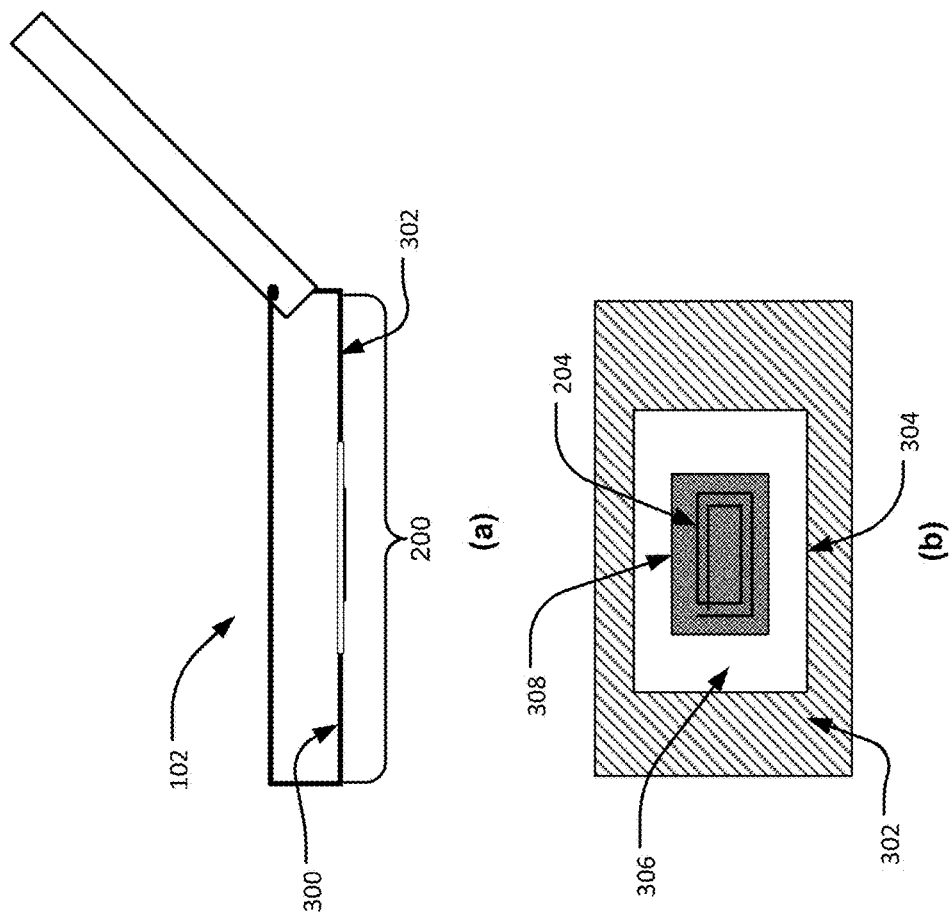
FIG. 3 illustrates an example structure of a wireless charging unit and an integrated coupler antenna in a device.

FIG. 3(a) shows an example structure of the wireless device 102 with the integrated wireless charging unit 200 as described herein. On the other hand, FIG. 3(b) shows a top view of the wireless charging unit 200 and the integrated coupler antenna 204.

The wireless charging unit 200 includes a conductive chassis such as a metallic chassis 300 that is positioned at the bottom of the wireless device 102. For example, the metallic chassis 300 may cover the bottom and surrounding keyboard areas of the wireless device 102. In this example, the metallic chassis 300, which is directly connected to a system ground (not shown) of the wireless device 102, is configured as a passive device electrode 302. In other words, the grounding of the passive device electrode 302 is directed to the system ground, which provides a path for the electrostatic discharge (ESD) noise to propagate to earth ground.

With continuing reference to FIG. 3(b), FIG. 3(b) shows the top view of the metallic chassis 300 with a cutout 304, a dielectric insert 306, an active device electrode 308, the passive device electrode 302 and the coupler antenna 204.

In an exemplary implementation, the cutout 304 is a portion of the metallic chassis 300 that is removed from its planar surface. For example, the cutout 304 is a square shape, a round shape, or an oblong shape that is curved out along middle portion of the metallic chassis 300. In this example, the dielectric insert 306 is inserted to cover the area that is defined by the cutout 304.

As an example of present implementations herein, the dielectric insert 306 is made up of composite materials (e.g., plastic materials) to provide mechanical strength to the removed portion of the metallic chassis 300. Furthermore, the dielectric insert 306 provides insulation to the metallic chassis 300 that is configured to act as the passive device electrode 302.

In an exemplary implementation, the dielectric insert 306 includes the integrated active device electrode 308. For example, the active device electrode 308 is a conductive plate that is laminated along middle portion of the dielectric insert 306. In this example, the coupler antenna 204 is further integrated to the active device electrode 308. A combined thickness (i.e., total thickness) of the dielectric inset 604, the active device electrode 308 and the coupler antenna 204 adapts the thickness of the metallic chassis 300. In other words, the introduction of the wireless charging unit 200 to the wireless device 102 is not limited by the availability of space within the wireless device 102.

Figure 4:
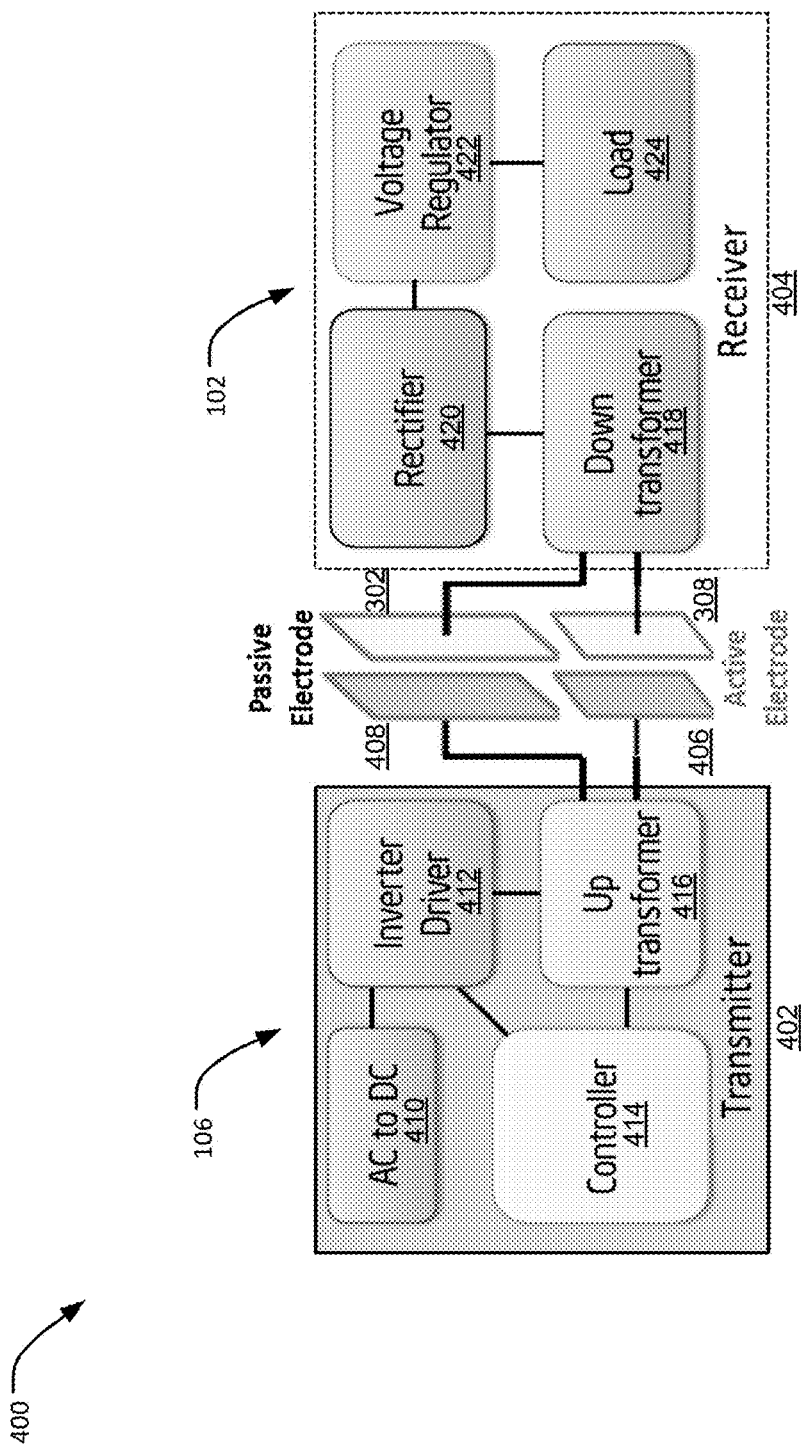
FIG. 4 illustrates an example system block diagram that implements a wireless charging of a device.

FIG. 4 illustrates an example system 400 that implements the wireless charging of the wireless device 102.

The example system 400 shows the wireless charging system block diagram of the docking station 106 and the wireless device 102. For example, the docking station 106 is configured to contain a transmitter 402 while the wireless device 102 is configured to contain the receiver 404. The transmitter 402 transmits the charging power while the receiver 404 receives the charging power through the electrical influence between the transmitter 402 and the receiver 404.

As an example of present implementations herein, the transmitter 402 includes an active docking electrode 406, a passive docking electrode 408, an AC to DC unit 410, an inverter driver 412, a controller 414 and an up-transformer 416. In an implementation, the transmitter 402 may be treated as the capacitive-charger component 202 of the docking station 106.

With continuing reference to FIG. 4, the receiver 404 includes the active device electrode 308, the passive device electrode 302, a down-transformer 418, a rectifier 420, a voltage regulator 422 and a load 424. In an implementation, the receiver 404 may be treated as the wireless charging unit 200 of the wireless device 102.

During the wireless charging (i.e., power transfer operation), the active docking electrode 406 and the active device electrode 308 are in close proximity with each other forming an equivalent capacitor (not shown). When the active docking electrode 406 is supplied with high voltages or potential by the up-transformer 416, a high electric field area is formed between and surrounding the active docking electrode 406 and the active device electrode 308. To this end, electric current will flow from the active docking electrode 406 to the active device electrode 308.

Similarly the proximity of the passive docking electrode 408 and the passive device electrode 302 forms another equivalent capacitor (not shown). The equivalent capacitor allows the return electric current to flow from the passive device electrode 302 to the passive docking electrode 408 and back to the up-transformer 416.

As an example of present implementations herein, the electrical influence between the active docking electrode 406 and the active device electrode 308 facilitates the capacitive wireless charging between the docking station 106 and the wireless device 102.

For example, at the transmitter 402 side, the AC to DC unit 410 provides a direct current (DC) output. The inverter driver 412 will then convert and utilize the DC output in supplying an alternating current (AC) input to the up-transformer 416. Typically, the inverter driver 412 and the up-transformer 416 is a high voltage high frequency (HVHF) power generator and its operation is controlled by the controller 414. For example, the up-transformer 416 supplies high amount of voltages to the active docking electrode 406. In this example, the controller 414 regulates the amount of AC input that is supplied by the inverter driver 412 and also the amount of voltages that are generated by the up-transformer 416.

The up-transformer 416 supplies the higher potential to the active docking electrode 406 while the passive docking electrode 408 is subjected to lower potential (i.e., treated as a reservoir or ground). In this set-up, the active docking electrode 406 generates the high electric fields, which in turn, will facilitate the transfer of the energy from the active docking electrode 406 of the docking station 106 to the active device electrode 308 of the wireless device 102.

At the receiver 404 side, the down-transformer 418 receives induced AC potential from the active device electrode 308 and downgrades or reduces the amount of this AC potential. For example, the reduction of the AC potential is implemented to conform with amount of biasing voltages to charge the load 424. In this example, the rectifier 420 will convert the decreased AC potential into DC output. The DC output is then supplied to the voltage regulator 422, which controls the amount of voltage that is supplied to the load 424. For example, the voltage regulator 422 supplies the charging DC current to the load 424.

Figure 5:
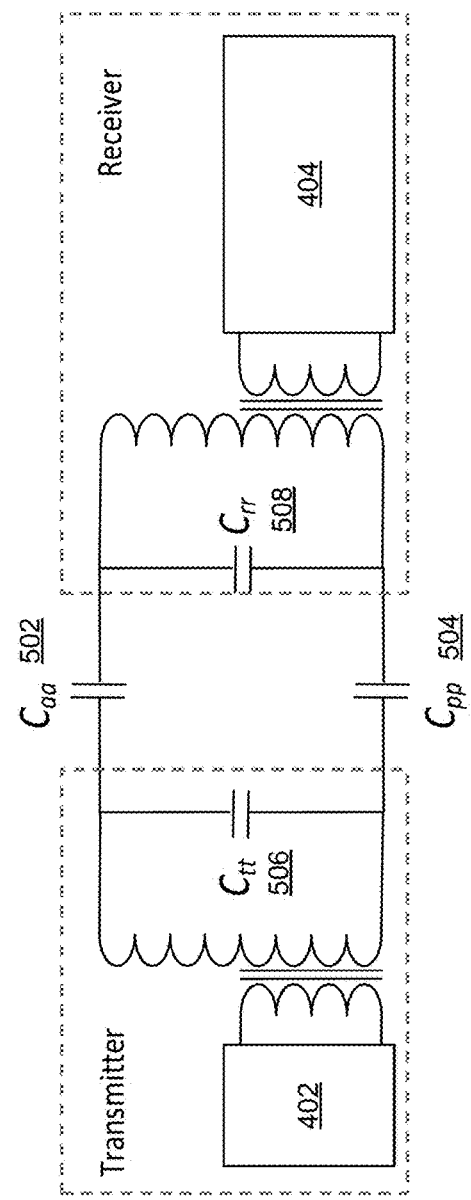
FIG. 5 illustrates an example equivalent circuit of a system block diagram that implements a wireless charging of a device

FIG. 5 illustrates an example equivalent circuit 500 of the system 400 in FIG. 4.

As shown, the equivalent circuit includes parallel plate capacitances $C_{aa}$ 502 and $C_{pp}$ 504, a capacitance $C_{tt}$ 506, and a capacitance $C_{rr}$ 508.

The plate capacitance $C_{aa}$ 502 may represent the capacitance between the active docking electrode 406 and the active device electrode 308. Similarly, the plate capacitance $C_{pp}$ 504 may represent the capacitance between the passive docking electrode 408 and the passive device electrode 302.

The capacitance $C_{tt}$ 506 may represent the capacitance between the active docking electrode 406 and the passive docking electrode 408 at the transmitter side 402. On the other hand, the capacitance $C_{rr}$ 508 may represent the capacitance between the active device electrode 308 and the passive device electrode 302 at the receiver side 404.

In order to deliver maximum power from the transmitter side 402 to the load 424 in the receiver side 404, the $C_{11}$ 506 need to be as small as possible in order to present high output impedance at the transmitter side 402. Similarly, the capacitance $C_{rr}$ 508 needs to be as low as possible in order to allow maximum power delivery to the load.

At the receiver side 404, the parallel plate capacitors $C_{aa}$ 502 and $C_{pp}$ 504 need to be as high as possible to maintain the high electric field during the charging power transfer. However, in order to have stable charging, the $C_{pp}$ 504 needs to be much larger than the $C_{aa}$ 502. Essentially the optimization between the 4 capacitances (i.e., $C_{tt}$ 506, $C_{rr}$ 508, $C_{aa}$ 502 and $C_{pp}$ 504) determines the power transfer efficiency of the wireless charging system. To this end, the perpendicular placement of active electrodes 406 and 308 may ensure the capacitance they form which is $C_{aa}$ 502. In other words, $C_{aa}$ 502 may remain stable while keeping position flexibility.

Figure 6:
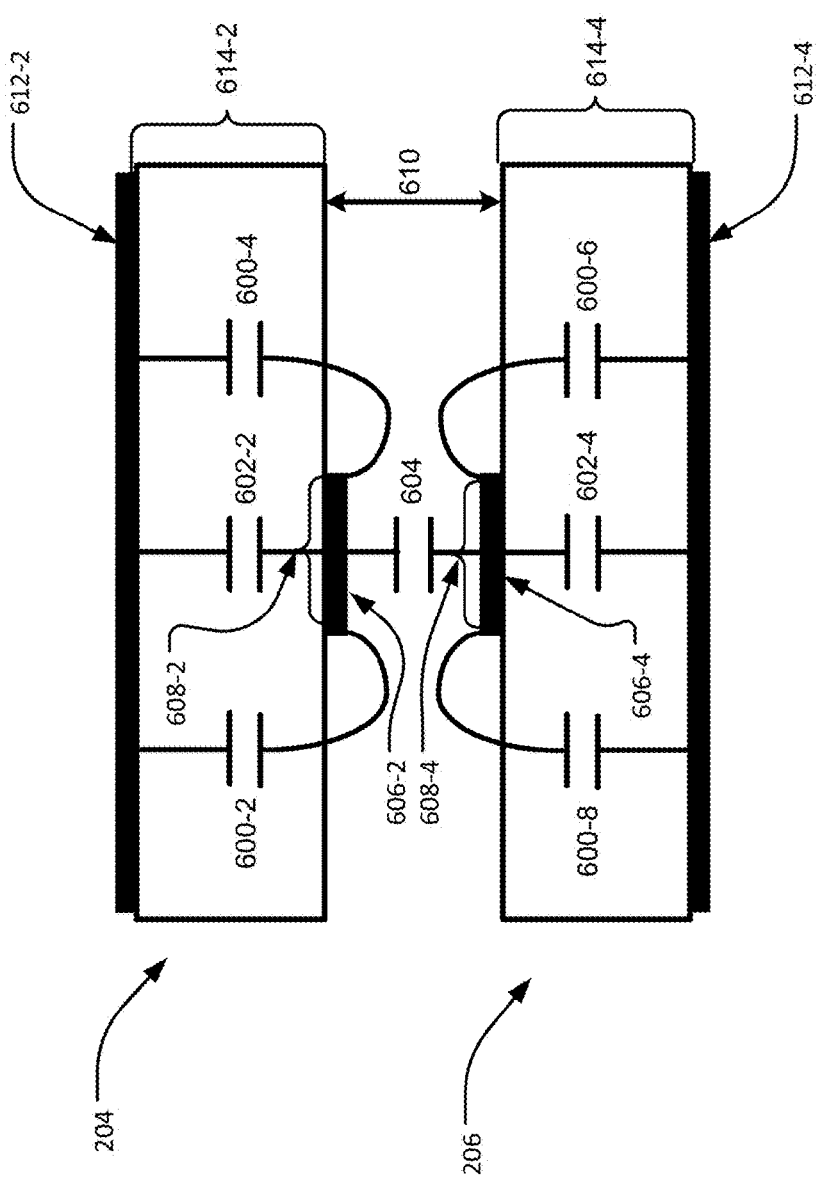
FIG. 6 illustrates an example structure and electrical characteristics of coupler antennas during a wireless connectivity operation.

FIG. 6 illustrates example structure and electrical characteristics of the coupler antennas 204 and 206. For example, the coupler antennas 204 and 206 may be integrated to the active device electrode 308 and the active docking electrode 406, respectively.

As shown, the coupler antenna 204 is in face-to-face position with the coupler antenna 206. In other words, the coupler antenna 204 is directly positioned within a near field radiation of the coupler antenna 206. Furthermore, FIG. 6 illustrates fringing capacitances 600, parallel plate capacitances 602, a coupling capacitance 604, microstrip conductors 606, microstrip conductor widths 608, a coupling distance 610, ground planes 612, and substrate thickness 614.

As an example of present implementations herein, the microstrip conductors 606 are low loss transmission lines that are commonly used, for example, in microwave circuits. A dielectric material with the substrate thickness 614 is positioned in between the microstrip conductor 606 and the ground plane 612. In an implementation, the ground plane 612-2 is connected to the active device electrode 308 of the wireless charging unit 200 while the ground plane 612-4 is connected to the active docking electrode 406 of the capacitive-charger component 202.

When the size of the substrate thickness 614-2 is thinner as compared to a wavelength and that the coupler antenna 204 is terminated by a matched load (not shown), then a smaller far field radiation may result. For example, the size of the wavelength is defined by frequency of a signal current in the microstrip conductor 606. In this example, the signal current that flows in the microstrip conductor 606-2 and the signal current that returns through the ground plane 612-2 (i.e., return path) appear to be very close to each other. As a result, the cancellation of the currents may generate the smaller far field radiation due to an exponential decay over distance of the fringing fields.

However, with regard to its near field radiation, the same structure may support a strong near field coupling. For example, when the microstrip conductor 606-2 and the microstrip conductor 606-4 are brought closer to each other during the docking operation, the coupling capacitance 604 will generate a higher value. In this example, the coupling capacitance 604 increases when the coupling distance 610 decreases. The coupling capacitance 604 further increases when a higher overlapping area between the microstrip conductors 606 is obtained. For example, a higher overlapping area between the microstrip conductor widths 608 increases the coupling capacitance 604. In another example, the signal strength that is transferred from the microstrip conductor 606-2 to the microstrip conductor 606-4 may be controlled by adjusting the amount of resulting coupling capacitance 604. This adjustment may optimize for enough coupling capacitance 604 and small enough discontinuity that is configured to produce less radiation in far-field.

With continuing reference to FIG. 6, the parallel plate capacitances 602 may include equivalent capacitances for parasitic capacitances in the microstrip lines. The parallel plate capacitances 602 co-exist with the fringing capacitances 600 when signal currents are flowing through the microstrip lines. For example, the fringing capacitances 600-2 and 600-4 represent electrical characteristics of the coupler antenna 204 due to energizing signal currents.

As mentioned above, the integration of the coupler antenna 204 to the wireless charging unit 200 may introduce additional unwanted amount of capacitance that may affect the efficiency of the wireless charging. Similarly, unwanted amount of capacitance is introduced at the docking station 106. To this end, as further discussed below, additional decoupling capacitances are integrated to the circuitry of the wireless device 102 and the docking station 106. For example, the decoupling capacitances minimize the effects of the unwanted amount of introduced capacitances.

Figure 7:
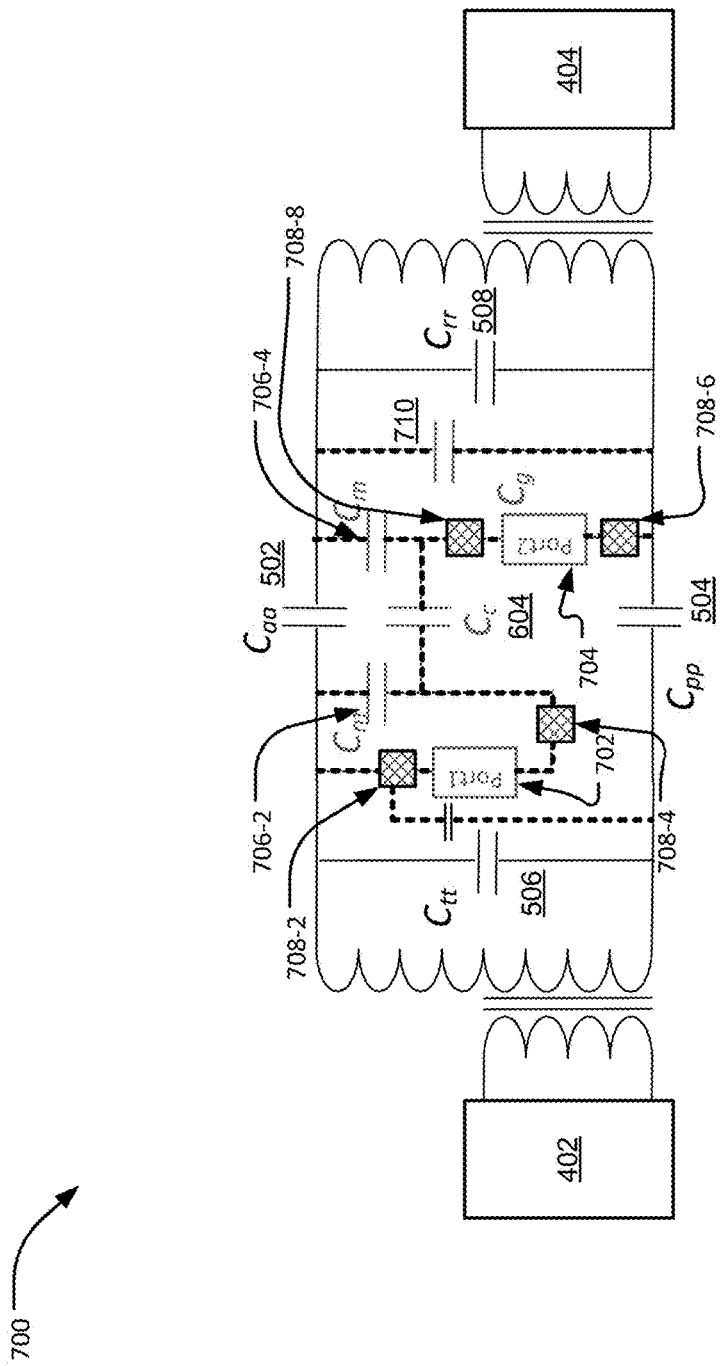
FIG. 7 illustrates an example schematic diagram of a wireless charging unit and a coupler antenna based-wireless docking combo.

FIG. 7. shows a schematic diagram 700 that illustrates the wireless charging unit and coupler antenna based-wireless docking combo. For example, the schematic diagram 700 represents a combination of the equivalent circuit 500 in FIG. 5 and the example electrical characteristics of the coupler antennas in FIG. 6.

As shown, a wireless charging path from the transmitter 402 to the receiver 404 is represented by solid lines. On the other hand, a data link path for data signals during the wireless connectivity is represented by broken lines.

Furthermore, FIG. 7 shows a port 702, a port 704, capacitances $C_m$ 706, the coupling capacitance 604, decoupling capacitors 708, and a capacitance Cg 710.

During the capacitive wireless charging operation, the active docking electrode 406 at the transmitter side 402 may carry up to a few thousand volts as opposed to a less than a millivolt in amplitude that is utilized during the wireless connectivity. To this end, the co-existence of the wireless charging unit 200 with the data link path may bring about interference and even damage to circuitry of the wireless connectivity.

For example, if no decoupling capacitors 708 is inserted into the circuitry of FIG. 7, a great portion of the wireless charging energy may be directly injected into the ports 702 and 704. In an implementation, the ports 702 and 704 are input ports, for example, of a Wi-Fi radio or module. The injected wireless charging energy may damage, for example, the Wi-Fi module.

In an implementation, the decoupling capacitors 708 are utilized to overcome the effects of the high voltage due to the integration of wireless charging electrodes and coupler antennas. For example, the decoupling capacitors 708 are of small value (e.g., a few pF) and of a high voltage rating (e.g., 500 Volts). In this example, the decoupling capacitors 708 are added to input and output portions of the data link path in order to isolate (i.e., open circuit) the low frequency charging energy from entering the ports 702 and 704. In these configurations, the decoupling capacitors 708 are not only effective in blocking the fundamental frequency of the charging frequency but also its harmonic frequencies.

For wireless charging operation, the coupling capacitance 604 is usually small in value and as such, it may be viewed as an open circuit to wireless charging system. However, the introduction of the capacitances Cm 706 and the capacitance Cg 710 due to the co-existence of data link and wireless charging circuitry cannot be ignored. The existence of the decoupling capacitors 708 will reduce the effect of the Cm 706. The effect of Cg 710 can be reduced by hardware configuration as further discussed below.

Figure 8:
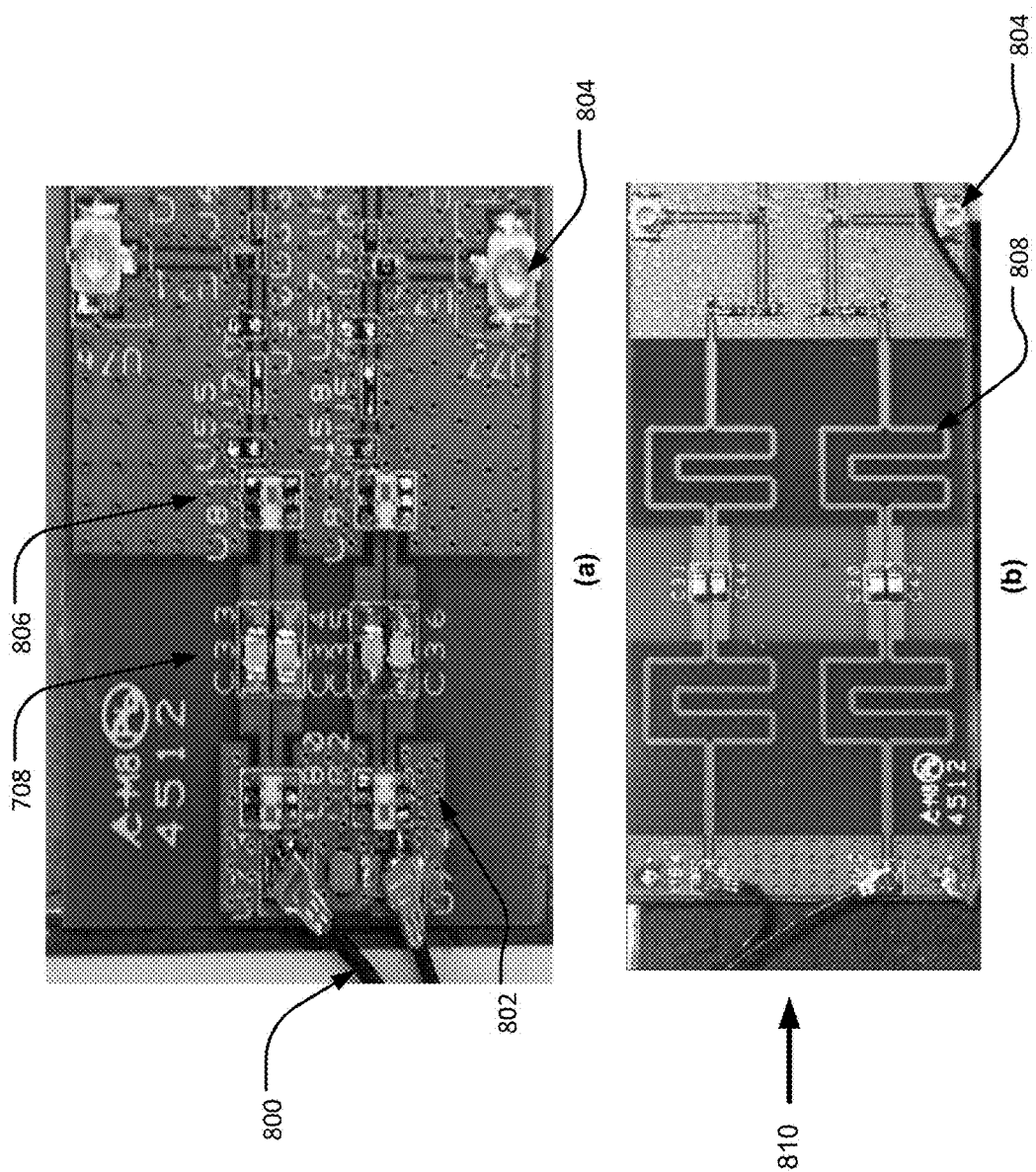
FIG. 8 shows an example illustration of a prototype board for separating a data signal from a wireless charging power signal.

FIG. 8 shows a picture of an example prototype board that implements separation of the charging energy from the data signal. For example, the prototype board includes a mini-coaxial cable 800, a ground reference 802, a system ground 804, a chip balun 806, and the decoupling capacitors 708.

In an implementation, the mini-coaxial cable 800 carries the data signal through its inner conductor while the charging power is carried by its outer conductor. In this implementation, a pair of decoupling capacitors 708 can be implemented on balanced transmission line to achieve a smooth transition for the data signal. In other words, there will lesser radiation, leakage, or interference by the charging power to the data signal.

Furthermore, a set of discrete baluns (e.g., chip balun 806), for example, are used to convert microstrip line output of a circuit connector to a coplanar strip line. This technique allows separation of the ground plane 802 of the circuit on the left portion of the prototype board (i.e., which carries the same potential as the active electrode) from the system ground 804 (i.e., which carries the same potential as the passive electrode) without creating significant discontinuity to the data signal. A similar function can also be achieved with distributed circuit baluns 808 as shown in FIG. 8b.

For example, the distributed circuit baluns 808 separates a data signal 810 from the system ground 804. In this example, there is minimal discontinuity in the data signal 810 as a result.

As discussed above, the combination of the passive device electrode 302 with the system chassis at the receiver side 404 enables easy integration of the charging solution. However the passive device electrode 302 is tied to the system ground 804 directly and as a result, any capacitance between the active device electrode 308 and the system ground 804 is added to the self capacitance (i.e., $C_{rr}$ 508) on the receiver side 404. This additional capacitance, in turn, degrades the charging power transfer efficiency.

To counter this introduction of additional capacitance, two decoupling capacitors 708 are positioned in series as shown in balanced circuit of FIG. 8a to couple the data signal to the Wi-Fi module (not shown). The two decoupling capacitors 708, for example, allows the data signal to pass through while the charging power is blocked.

With regard to the introduced self capacitance Cg 710 as shown in FIG. 7, a circuit area for the ground references 802 is reduced and the air gap is increased between the motherboard and the system chassis/passive electrode. For example, as shown in FIG. 8a, the ground reference 802 on the left part is minimized to reduce the $C_g$ 710 when the prototype board is integrated into the system of the wireless device 102.

Figure 9:
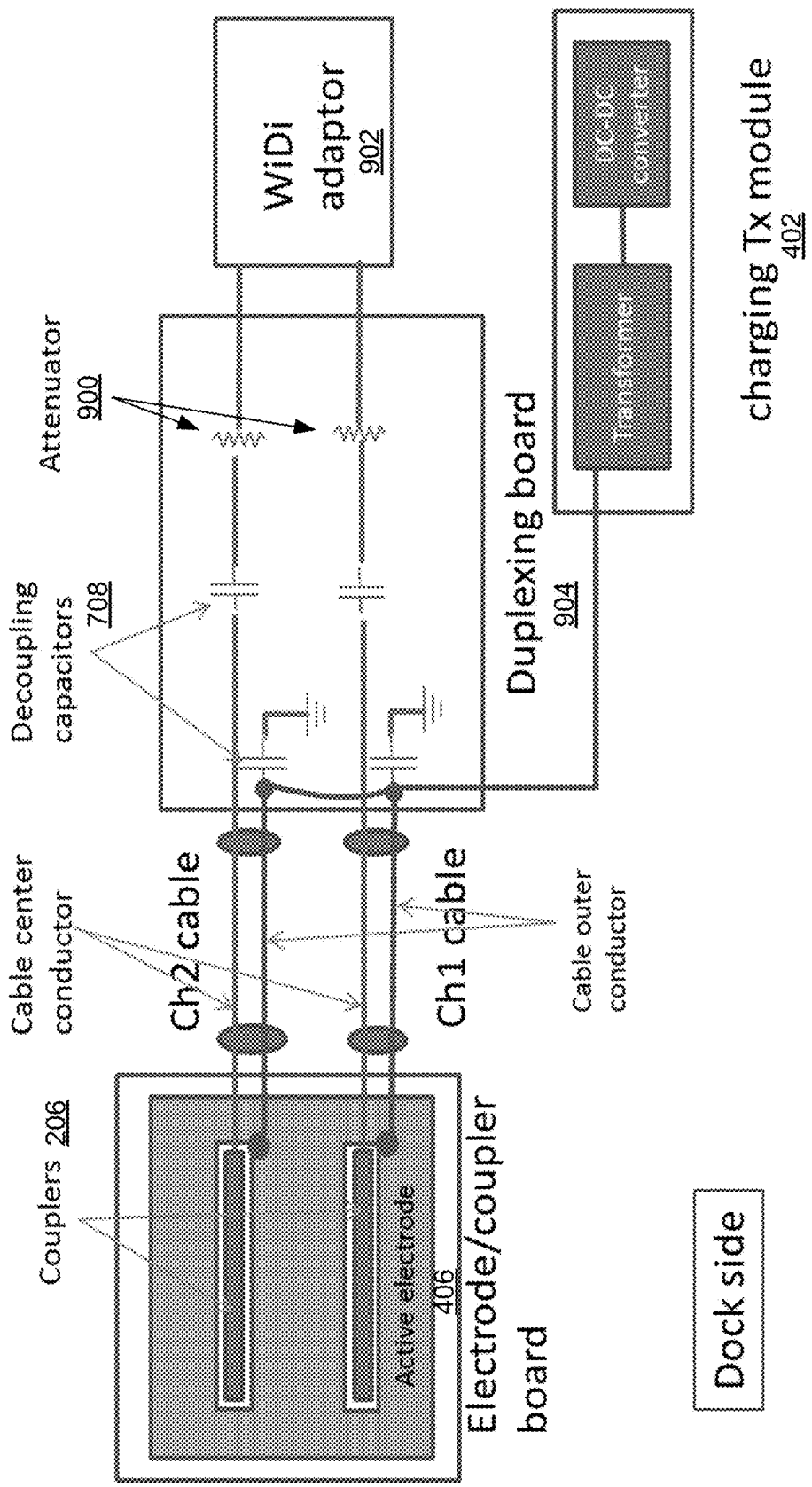
FIG. 9 illustrates an example system level block diagram of a wireless docking combo at docking side.

FIG. 9 illustrates an example system level block diagram of the wireless docking combo at the docking side.

As shown, FIG. 9 includes the coupler antenna 206, the active docking electrode 406, the decoupling capacitors 708, the transmitter module 402, an attenuator 900, a Wi-Di adaptor 902, and a duplexing board 904.

At the docking side, the active docking electrode 406 collocates with the coupler antenna 206 on the same space. In other words, the capacitive-charger component 202 and the coupler antenna 206 are integrated to form a single unit. The data signal and the charging power in this single unit may be delivered to the duplexing board 904 through a coaxial cable (e.g., mini-coaxial cable 800). For example, the center conductor of the mini-coaxial cable 800 carries the data signal while its outer conductor carries the charging power.

In an implementation, the attenuators 900 and the coupling capacitance 604 are configured to control data signal strength. For example, the attenuator 900 is added in series with the decoupling capacitors 708 to prevent or limit the leakage in the data signal by controlling the amplitude of the data signal. In another example, the coupling capacitance 604 is controlled to obtain strong near-field radiation. In these examples, the decoupling capacitors 708 and the attenuator 900 may be treated as a high-frequency filter.

For example, the high-frequency filter allows the high frequency data signal to be processed by the Wi-Di adaptor 902 while it blocks or separates the low-frequency charging power signal from the transmitter module 402. In this example, the blocking of the low-frequency charging power signal prevents interference in the wireless docking combo.

Figure 10:
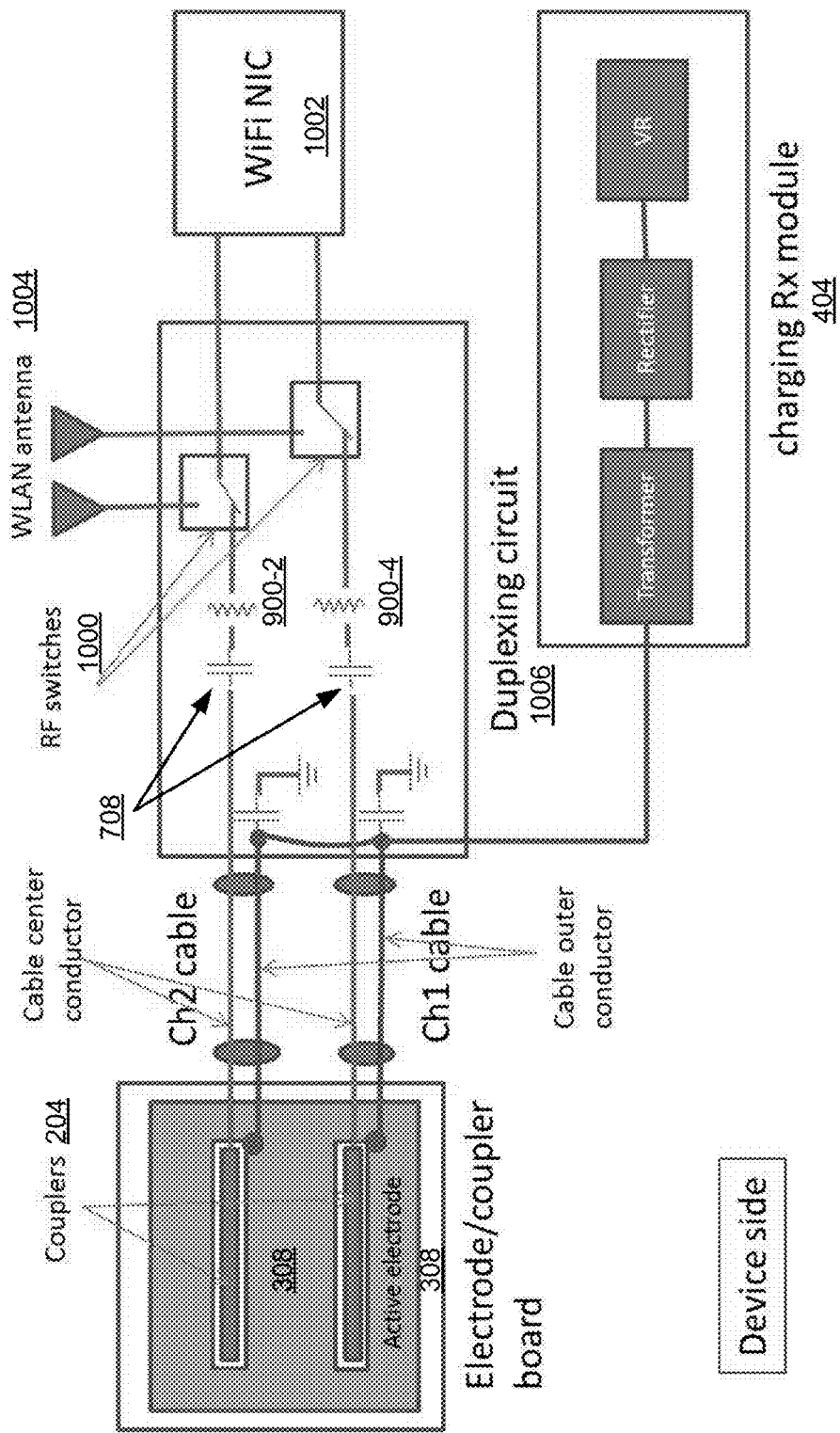
FIG. 10 shows an example system level block diagram of a wireless docking combo at a device side

FIG. 10 illustrates an example system level block diagram of the wireless docking combo at the device side.

As shown, FIG. 10 includes the coupler antenna 204, the active device electrode 308, the decoupling capacitors 708, the attenuators 900, the receiver module 404, RF switches 1000, a Wi-Fi module 1002, WLAN antennas 1004 and a duplexing circuit 1006.

In an implementation, the system level block diagram at the device side operates similarly as the system level block diagram of the docking side (i.e., FIG. 9). For example, the coupler antenna 204 facilitates the receiving and transmitting of the data signal. In this example, the Wi-Fi module 1002 is configured to process this data signal.

In an implementation, the decoupling capacitors 708 and the attenuators 900 are utilized to couple the coupler antenna 204 to the Wi-Fi module 1002. In this implementation, the decoupling capacitors 708 and the attenuators 900 may be similarly treated as high-frequency filter. For example, the high-frequency filter provides a low impedance and a high impedance to the data signal and the charging power, respectively. In this example, the high-frequency filter may prevent the charging power from interfering through input and output ports of the Wi-Fi module 1002.

In an implementation, the RF switches 1000 are added to toggle connections from the Wi-Fi module 1002 to either the WLAN antenna 1004 or the coupler antenna 204. The WLAN antenna 1004 may be utilized for Internet connectivity while the coupler antenna 204 may be utilized for wireless connectivity. In this implementation, the WLAN antenna 1004 or the coupler antenna 204 utilizes higher frequency signals as compared to the low-frequency wireless charging power.

With continuing reference to FIG. 10, the active device electrode 308 forms part of the wireless charging unit 200. The other components, as described above, include the passive device electrode 302 and the dielectric plastic 306.

Figure 11:
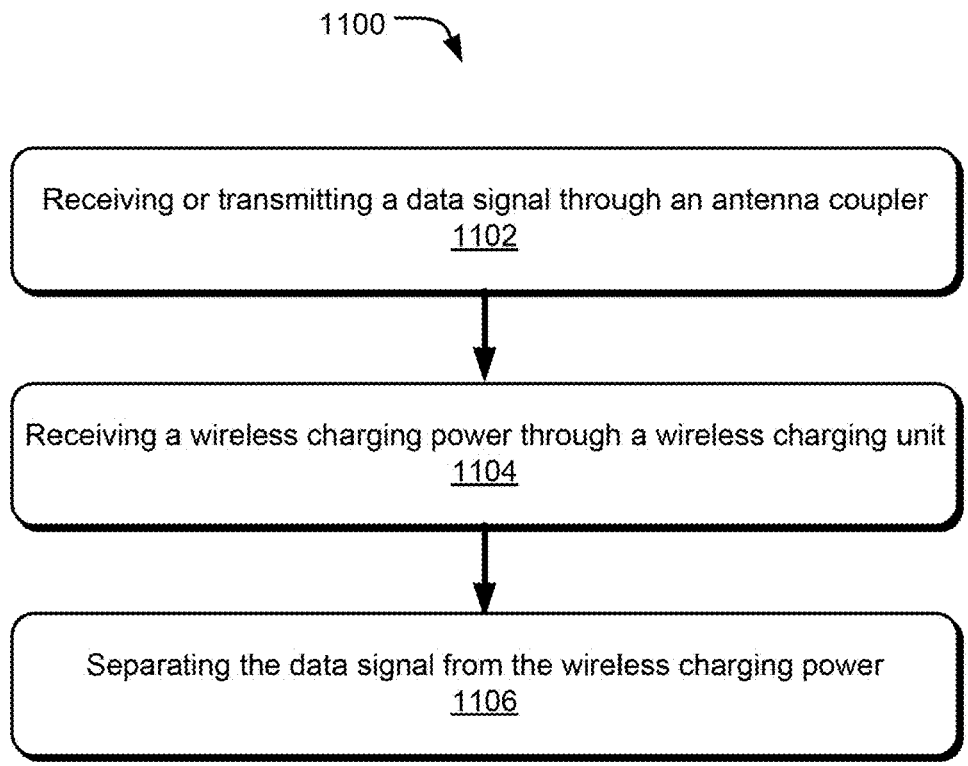
FIG. 11 shows an example process chart illustrating an example method of implementing a wireless charging and a wireless connectivity combo in a device The following Detailed Description is provided with reference to the accompanying figures. In the figures, the left-most digit(s) of a reference number usually identifies the figure in which the reference number first appears. The use of the same reference numbers in different figures indicates similar or identical items.

FIG. 11 shows an example process chart 1100 illustrating an example method of implementing a wireless charging and a wireless connectivity combo in a device. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 1102, receiving or transmitting a data signal through a coupler antenna is performed. In an implementation, the coupler antenna 204 is utilized facilitate the receiving or the transmitting of the data signal. In this implementation, the data signal is processed by a Wi-Fi module (e.g., Wi-Fi module 1002) during the wireless connectivity operation.

At block 1104, receiving a wireless charging power through a wireless charging unit is performed. In an implementation, the wireless charging unit (e.g., wireless charging unit 200) includes a conductive chassis (e.g., metallic chassis 300) that is configured to act as a passive device electrode (e.g., passive device electrode 302). In this implementation, the conductive chassis includes a cutout (e.g., cutout 304) along a planar surface of a bottom portion of the device (e.g., wireless device 102).

Furthermore, the wireless charging unit 200 includes a dielectric insert (e.g., dielectric inset 604) that is positioned to cover an area of the cutout 304. In an implementation, the dielectric insert 306 is made of non-conductive plastic materials provide insulation to the wireless charging unit 200. In this implementation, the dielectric insert 306 is shaped to cover the area of the cutout 304. Furthermore, the dielectric insert 306 is mounted to provide mechanical strength in the metallic chassis 300.

Furthermore still, the wireless charging unit 200 includes a conductive plate that is integrated to the dielectric insert 306. For example, the conductive plate is configured to act as an active device electrode (e.g., active device electrode 308) that is laminated or integrated to the dielectric insert 306. In this example, the active device electrode 308 may be subjected to high electric fields during capacitive wireless charging process. The electric fields may be generated, for example, by the capacitive-charger component of the docking station 106.

At block 1106, separating the data signal from the wireless charging power is performed. In an implementation, a high-frequency filter (e.g., decoupling capacitors 708 and/or attenuator 900) is utilized to couple the coupler antenna 204 to the Wi-Fi module 1002. In this implementation, the high-frequency filter provides a low impedance and a high impedance to the data signal and the wireless charging power, respectively. In other words, the high-frequency filter allows the data signal to pass between the coupler antenna 204 and the Wi-Fi module 1002 while it blocks the low-frequency wireless charging power from interfering with the data signal.

The following examples pertain to further embodiments:

Example 1 is a device comprising a coupler antenna configured to facilitate receiving or transmitting a data signal; a wireless communication module configured to process the data signal; and a filter that couples the coupler antenna to the wireless communication module, the filter unit comprising a capacitor that provides an impedance to the data signal and a charging power, respectively.

In Example 2, the device as recited in Example 1, wherein the wireless charging unit further comprises a conductive chassis positioned at a bottom surface of the device, the conductive chassis includes a cutout that forms an opening in the bottom surface, wherein the conductive chassis is configured as a passive device electrode; a dielectric insert that is positioned to cover an area of the cutout; and a conductive plate that is integrated to the dielectric insert, the conductive plate is configured as an active device electrode, wherein the active device electrode and the passive device electrode facilitates the receiving of the charging power.

In Example 3, the device as recited in Examples 1 or 2, wherein the wireless communication module is a WiFi module.

In Example 4, the device as recited in Example 3, wherein at least one decoupling capacitor is positioned at an input port and an output port of the Wi-Fi module.

In Example 5, the device as recited in Example 3, wherein the filter unit is a high frequency filter unit that comprises a decoupling capacitor that provides a low impedance and a high impedance to the data signal and the charging power, respectively.

In Example 6, the device as recited in Example 5, wherein the high-frequency filter includes an attenuator that is configured to control an amplitude of the data signal, wherein the amplitude of the data signal is further controlled by adjusting a coupling capacitance between the coupler antenna and another coupler antenna during a wireless connectivity In Example 7, the device as recited in Examples 1 or 2, further comprising a wireless charging unit configured to facilitate receiving of the charging power, wherein the wireless charging unit and the coupler antenna are integrated to form a single unit.

In Example 8, the device as recited in Example 7, wherein the wireless charging unit includes a conductive plate that is utilized as a ground plane by the coupler antenna.

In Example 9, the device as recited in Example 7, wherein the wireless charging unit includes a conductive chassis that is directly connected to a system ground.

In Example 10, the device as recited in Example 7, wherein the integration of the coupler antenna to the wireless charging unit includes a ground reference, the ground reference includes a reduced circuit area.

In Example 11, the device as recited in Examples 1 or 2, wherein the filter includes a set of discrete baluns that is configured to facilitate continuity of the data signal.

In Example 12, the device as recited in Examples 1 or 2, wherein the device is selected from a group that includes a tablet, a mobile phone, and a laptop.

Example 13 is a wireless docking combo comprising: a coupler antenna that is configured to facilitate receiving or transmitting of a data signal; a wireless communication module configured to process the data signal; and a filter unit coupling the coupler antenna to the wireless communication module, the filter unit includes a capacitor at an input port and an output port of the wireless communication module, the capacitor is configured to provide an impedance to the data signal and a charging power, respectively.

In Example 14, the wireless docking combo as recited in Example 13, wherein the wireless communication module is a WiFi module.

In Example 15, the wireless docking combo as recited in Example 13, further comprising a wireless charging unit configured to facilitate receiving of the charging power, wherein the wireless charging unit and the coupler antenna are integrated to form the wireless docking combo.

In Example 16, the wireless docking combo as recited in Examples 13, 14, or 15, wherein the wireless charging unit further comprises: a conductive chassis positioned at a bottom surface of the device, the conductive chassis includes a cutout that forms an opening in the bottom surface, wherein the conductive chassis is configured as a passive device electrode; a dielectric insert that is positioned to cover an area of the cutout; and a conductive plate that is integrated to the dielectric insert, the conductive plate is configured as an active device electrode, wherein the active device electrode and the passive device electrode facilitates the receiving or the transmitting of the charging power.

In Example 17, the wireless docking combo as recited in Examples 13, 14, or 15, wherein the wireless charging unit includes a conductive plate that is utilized as a ground plane by the coupler antenna.

In Example 18, the wireless docking combo as recited in Example 15, wherein the wireless charging unit includes a conductive chassis that is directly connected to a system ground.

In Example 19, the wireless docking combo as recited in Examples 13, 14, or 15, wherein the filter unit is a high-frequency filter unit that couples the coupler antenna to the wireless communication module, the high-frequency filter unit includes a decoupling capacitor at an input port and an output port of the wireless communication module, the decoupling capacitor is configured to provide a low impedance and a high impedance to the data signal and a charging power, respectively.

In Example 20, the wireless docking combo as recited in Example 19, wherein the high-frequency filter includes an attenuator that is configured to control a strength of the data signal, wherein the strength of the data signal is further controlled by adjusting a coupling capacitance between the coupler antenna and another coupler antenna during a wireless connectivity.

In Example 21, the wireless docking combo as recited in Examples 13, 14, or 15, wherein the high-frequency filter includes a set of discrete baluns that is configured to facilitate continuity of the data signal.

In Example 22, the wireless docking combo as recited in Examples 13, 14, or 15, wherein the wireless docking combo is a component of a tablet, a mobile phone, or a laptop.

Example 23 is a method of implementing a wireless charging and a wireless connectivity combo in a device, the method comprising: receiving or transmitting a data signal through a coupler antenna; receiving a wireless charging power through a wireless charging unit; and separating the data signal from the wireless charging power by using a capacitor that provides an impedance to the data signal and the wireless charging power, respectively.

In Example 24, the wireless docking combo as recited in Example 23, wherein the receiving or transmitting of the data signal utilizes an attenuator that is configured to control a strength of the data signal, wherein the strength of the data signal is further controlled by adjusting a coupling capacitance between the coupler antenna and another coupler antenna during a wireless connectivity.

In Example 25, the wireless docking combo as recited in Examples 23 or 24, wherein the decoupling capacitor is positioned at an input port and an output port of a wireless fidelity (Wi-Fi) module that is configured to process the data signal.

In Example 26, the wireless docking combo as recited in Examples 23, 24 or 25, wherein the data signal includes a high-frequency data signal while the wireless charging power includes a low-frequency wireless charging power.

What is claimed is:
1. A device comprising:
a wireless charger configured to facilitate receiving a charging power and comprising:
  a coupler antenna configured to facilitate receiving or transmitting a data signal;
  a conductive chassis configured as a passive device electrode, positioned at a bottom surface of the device, and including a cutout that forms an opening in the bottom surface;
  a dielectric insert that is positioned to cover an area of the cutout; and
  a conductive plate that is integrated to the dielectric insert, the conductive plate being configured as an active device electrode, wherein the active device electrode and the passive device electrode facilitate the receiving of the charging power;
a wireless communication processor configured to process the data signal; and
a filter configured to couple the coupler antenna to the wireless communication processor, the filter comprising a capacitor configured to provide a first impedance to the data signal and a second impedance to the charging power.

2. The device as recited in claim 1, wherein the wireless communication processor is a Wireless-Fidelity (Wi-Fi) processor.

3. The device as recited in claim 2, wherein at least one decoupling capacitor is positioned at an input port and an output port of the Wi-Fi processor.

4. The device as recited in claim 1, wherein the filter is a high frequency filter that comprises a decoupling capacitor configured to provide the first and the second impedances, the first impedance being a low impedance and the second impedance being a high impedance.

5. The device as recited in claim 4, wherein the high frequency filter includes an attenuator that is configured to control an amplitude of the data signal, wherein the amplitude of the data signal is further controlled by adjusting a coupling capacitance between the coupler antenna and another coupler antenna during a wireless connectivity.

6. The device as recited in claim 1, wherein the wireless charger and the coupler antenna are integrated to form a single circuitry.

7. The device as recited in claim 6, wherein the wireless charger includes a conductive plate that is utilized as a ground plane by the coupler antenna.

8. The device as recited in claim 6, wherein the wireless charger includes the conductive chassis, wherein the conductive chassis is directly connected to a system ground.

9. The device as recited in claim 6, wherein the integration of the coupler antenna to the wireless charger includes a ground reference and the ground reference includes a reduced circuit area.

10. The device as recited in claim 1, wherein the filter includes a set of discrete baluns that is configured to facilitate continuity of the data signal by separating the data signal from a system ground.

11. The device as recited in claim 1, wherein the device comprises a tablet, a mobile phone, or a laptop.

12. A wireless docking combo comprising: a wireless charger configured to facilitate receiving a charging power, and comprising: a coupler antenna configured to facilitate receiving or transmitting of a data signal; a conductive chassis configured as a passive device electrode, being positioned at a bottom surface of the device, and including a cutout that forms an opening in the bottom surface; a dielectric insert that is positioned to cover an area of the cutout; and a conductive plate that is integrated to the dielectric insert, the conductive plate being configured as an active device electrode, wherein the active device electrode and the passive device electrode facilitate the receiving or the transmitting of the charging power; a wireless communication processor configured to process the data signal; and a filter configured to couple the coupler antenna to the wireless communication processor, wherein the filter comprises a capacitor at an input port and an output port of the wireless communication the capacitor being configured to provide a first impedance to the data signal and a second impedance to the charging power.

13. The wireless docking combo as recited in claim 12, wherein the wireless communication processor is a Wireless-Fidelity (Wi-Fi) processor.

14. The wireless docking combo as recited in claim 12, wherein the wireless charger and the coupler antenna are integrated to form a circuitry of the wireless docking combo.

15. The wireless docking combo as recited in claim 14, wherein the wireless charger includes a conductive plate that is utilized as a ground plane by the coupler antenna.

16. The wireless docking combo as recited in claim 14, wherein the wireless charger includes the conductive chassis, wherein the conductive chassis is directly connected to a system ground.

17. The wireless docking combo as recited in claim 12, wherein the filter is a high-frequency filter that couples the coupler antenna to the wireless communication processor, the high-frequency filter includes a decoupling capacitor at an input port and an output port of the wireless communication processor, the decoupling capacitor is configured to provide the first and the second impedances, the first impedance being a low impedance and the second impedance being a high impedance.

18. The wireless docking combo as recited in claim 17, wherein the high-frequency filter includes an attenuator that is configured to control a strength of the data signal, wherein the strength of the data signal is further controlled by adjusting a coupling capacitance between the coupler antenna and another coupler antenna during a wireless connectivity.

19. The wireless docking combo as recited in claim 12, wherein the high-frequency filter includes a set of discrete baluns that is configured to facilitate continuity of the data signal by separating the data signal from a system ground.

20. The wireless docking combo as recited in claim 12, wherein the wireless docking combo is a component of a tablet, a mobile phone, or a laptop.

21. A method of implementing a wireless charging and a wireless connectivity combo in a device, the method comprising: receiving or transmitting a data signal through a coupler antenna; receiving a wireless charging power through a wireless charger that comprises: a conductive chassis configured as a passive device electrode, positioned at a bottom surface of the device, and including a cutout that forms an opening in the bottom surface; a dielectric insert that is positioned to cover an area of the cutout; and a conductive plate that is integrated to the dielectric insert, the conductive plate being configured as an active device electrode, wherein the active device electrode and the passive device electrode facilitate the receiving or the transmitting of the charging power; separating the data signal from the wireless charging power by using a capacitor that provides a first impedance to the data signal and a second impedance to the wireless charging power.

22. The method as recited in claim 21, wherein the receiving or transmitting of the data signal utilizes an attenuator that is configured to control a strength of the data signal, wherein the strength of the data signal is further controlled by adjusting a coupling capacitance between the coupler antenna and another coupler antenna during a wireless connectivity.

23. The method as recited in claim 21, wherein the decoupling capacitor is positioned at an input port and an output port of a Wireless-Fidelity (Wi-Fi) processor that is configured to process the data signal.

24. The method as recited in claim 21, wherein the data signal includes a high-frequency data signal while the wireless charging power includes a low-frequency wireless charging power.

25. The method as recited in claim 21, wherein the wireless charger and coupler antenna are integrated to form a single circuitry.

* * * * *